United States Patent
Choi

(10) Patent No.: US 7,663,826 B2
(45) Date of Patent: Feb. 16, 2010

(54) METHOD AND APPARATUS FOR COPYING DATA FROM ONE DISC DRIVE TO ANOTHER DISC DRIVE

(75) Inventor: Jin-won Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 11/330,169

(22) Filed: Jan. 12, 2006

(65) Prior Publication Data

US 2006/0158761 A1    Jul. 20, 2006

(30) Foreign Application Priority Data

Jan. 19, 2005   (KR) ............... 10-2005-0005068

(51) Int. Cl.
G11B 5/86        (2006.01)
(52) U.S. Cl. ............... 360/15; 360/27; 360/62; 711/111; 711/162
(58) Field of Classification Search ............. None
See application file for complete search history.

(56) References Cited

U.S. PATENT DOCUMENTS

| | | | | |
|---|---|---|---|---|
| 5,274,784 A * | 12/1993 | Arimilli et al. | ............. | 710/307 |
| 5,519,882 A * | 5/1996 | Asano et al. | ............. | 710/10 |
| 6,012,130 A * | 1/2000 | Beyda et al. | ............. | 711/173 |
| 6,073,220 A * | 6/2000 | Gunderson | ............. | 711/162 |
| 6,145,019 A * | 11/2000 | Firooz et al. | ............. | 710/8 |
| 6,170,037 B1 * | 1/2001 | Blumenau | ............. | 711/114 |
| 6,188,571 B1 * | 2/2001 | Roganti et al. | ............. | 361/685 |
| 6,289,423 B1 * | 9/2001 | Ozaki et al. | ............. | 711/163 |
| 6,292,852 B1 * | 9/2001 | Bodo et al. | ............. | 710/20 |
| 6,425,049 B1 * | 7/2002 | Yamamoto et al. | ............. | 711/112 |
| 6,446,176 B1 * | 9/2002 | West et al. | ............. | 711/162 |
| 6,453,395 B1 * | 9/2002 | Gehr | ............. | 711/162 |
| 6,647,436 B1 * | 11/2003 | Jedrzejewski et al. | ............. | 710/14 |
| 6,735,671 B1 * | 5/2004 | Kida | ............. | 711/111 |
| 7,159,088 B2 * | 1/2007 | Hirakawa et al. | ............. | 711/162 |
| 7,246,192 B1 * | 7/2007 | Chang | ............. | 710/311 |
| 7,251,709 B2 * | 7/2007 | Williams | ............. | 711/114 |
| 7,287,182 B2 * | 10/2007 | Tanaka et al. | ............. | 714/7 |
| 2002/0133747 A1 * | 9/2002 | Ravid | ............. | 714/20 |
| 2003/0014520 A1 * | 1/2003 | Rinaldis et al. | ............. | 709/225 |
| 2004/0081427 A1 * | 4/2004 | Kwon | ............. | 386/52 |
| 2004/0128457 A1 * | 7/2004 | Maki | ............. | 711/162 |
| 2005/0033933 A1 * | 2/2005 | Hetrick et al. | ............. | 711/165 |
| 2006/0130316 A1 * | 6/2006 | Takase et al. | ............. | 29/603.09 |

FOREIGN PATENT DOCUMENTS

| | | |
|---|---|---|
| KR | 20-0264312 | 2/2002 |
| KR | 10-2004-0033969 | 4/2004 |
| KR | 10-2004-0055427 | 6/2004 |

* cited by examiner

Primary Examiner—Dismery E Mercedes
(74) Attorney, Agent, or Firm—Staas & Halsey LLP

(57) ABSTRACT

A method and an apparatus for copying data of a disc drive are provided. The method includes: determining whether the first disc drive has a predetermined jumper pin connection by identifying which of a plurality of jumper pins in a jumper block of the first disc drive are connected, the jumper block being used to determine an operation mode of the first disc drive; transmitting a copy command from the first disc drive to the second disc drive if the first disc drive has the predetermined jumper pin connection; and copying data recorded in the first disc drive to the second disc drive in response to the copy command. Accordingly, it is possible to copy data recorded in a first hard disc drive (HDD) to a second HDD without the aid of an additional host.

21 Claims, 8 Drawing Sheets

US 7,663,826 B2

METHOD AND APPARATUS FOR COPYING DATA FROM ONE DISC DRIVE TO ANOTHER DISC DRIVE

CROSS-REFERENCE TO RELATED APPLICATION

This application claims the benefit of Korean Patent Application No. 10-2005-0005068, filed on Jan. 19, 2005, in the Korean Intellectual Property Office, the disclosure of which is incorporated herein in its entirety by reference.

BACKGROUND OF THE INVENTION

1. Field of the Invention

The present invention relates generally to a method and an apparatus for copying data of a disc drive. More particularly, embodiments of the present invention relate to a method and an apparatus for copying data from a first disc drive to a second disc drive.

2. Description of the Related Art

In general, hard disc drives (HDDs) store data transmitted by a host and transmit data stored therein to the host at the request of the host. The host may be, for example, a personal computer (PC), a set-top box, or an X-box.

In order to copy data from one HDD to another HDD, they both must be connected to a host. Data stored in an HDD is input to a host system in response to a read command issued by a host. Thereafter, the data input to the host system is copied to another HDD in response to a write command issued by the host. A user can copy data from one HDD to another HDD by executing an application program in a host.

Data recorded in an HDD may be copied to a plurality of HDDs by, for example, a PC manufacturer. However, a conventional method of copying data of a disc drive requires as many hosts as there are disc drives to copy data from one disc drive to the rest of the disc drives. Therefore, users of such a conventional method incur additional costs.

SUMMARY OF THE INVENTION

In one aspect, the present invention provides a method of copying data from a first disc drive to a second disc drive, which enables data recorded in the first disc drive to be copied to the second disc drive without the aid of an additional host by transmitting a copy command from the first disc drive to the second disc drive after identifying which pins among a plurality of the first disc drive are connected.

In another aspect, the present invention also provides an apparatus for copying data from a first disc drive to a second disc drive, which enables data recorded in the first disc drive to be copied to the second disc drive without the aid of an additional host by transmitting a copy command from the first disc drive to the second disc drive after identifying which pins among a plurality of the first disc drive are connected.

According to an aspect of the present invention, there is provided a method of copying data from a first disc drive to a second disc drive. The method includes: determining whether the first disc drive has a predetermined jumper pin connection by identifying which of a plurality of jumper pins in a jumper block of the first disc drive are connected, the jumper block being used to determine an operation mode of the first disc drive; transmitting a copy command from the first disc drive to the second disc drive if the first disc drive has the predetermined jumper pin connection; and copying data recorded in the first disc drive to the second disc drive in response to the copy command.

According to another aspect of the present invention, there is provided an apparatus for copying data from a first disc drive to a second disc drive. The apparatus includes: a first disc drive, to transmit a command to copy data recorded therein if it recognizes that it has a predetermined jumper pin connection by identifying which of a plurality of jumper pins in a jumper block thereof are connected, the jumper block being used to determine an operation mode of the first disc drive; a second disc drive to copy the data recorded in the first disc drive in response to the command transmitted by the first disc drive; and a communication path to connect an interface unit of the first disc drive and an interface unit of the second disc drive.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
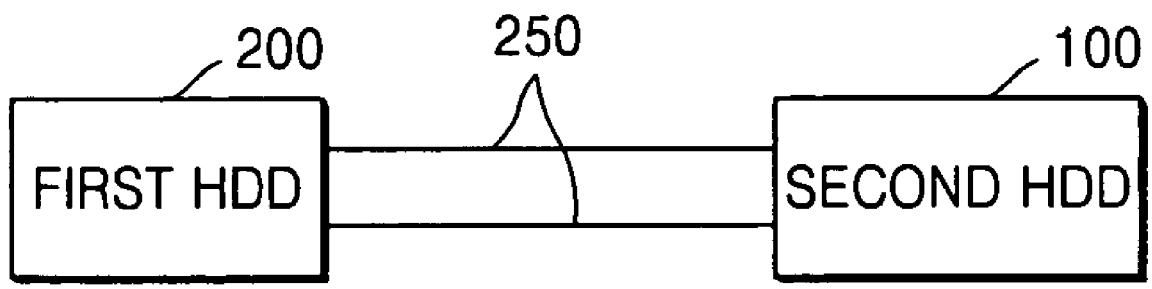
FIG. 1 is a block diagram illustrating an apparatus for copying data of a disc drive according to an exemplary embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating an apparatus for copying data of a disc drive according to an exemplary embodiment of the present invention. Referring to FIG. 1, the apparatus includes a first hard disc drive (HDD) 200, a second HDD 100, and communication paths 250. Data recorded in the first HDD 200 can be copied to the second HDD 100 via the communication paths 250.

In general, the Advanced Technology Attachment (ATA) specification standardizes integrated device electronics (IDE), which is a type of HDD interface used in a PC/AT compatible device. An ATA interface is classified as a parallel ATA (PATA) interface or a serial ATA interface (SATA).

A PATA interface is a parallel data transmission interface, and an SATA interface is a serial data transmission interface. An SATA approach enables the inner structure of a PC to be simplified using thin interconnections. An SATA HDD is an HDD that adopts the SATA approach.

In the present embodiment, the first and second HDDS 200 and 100 are SATA HDDs connected by the communication paths 250. However, one skilled in the art will appreciate that alternative embodiments of the invention may be possible, including embodiments using non SATA HDDs. These alternative embodiments of the invention should be considered to be within the scope of the present invention.

Figure 2A:
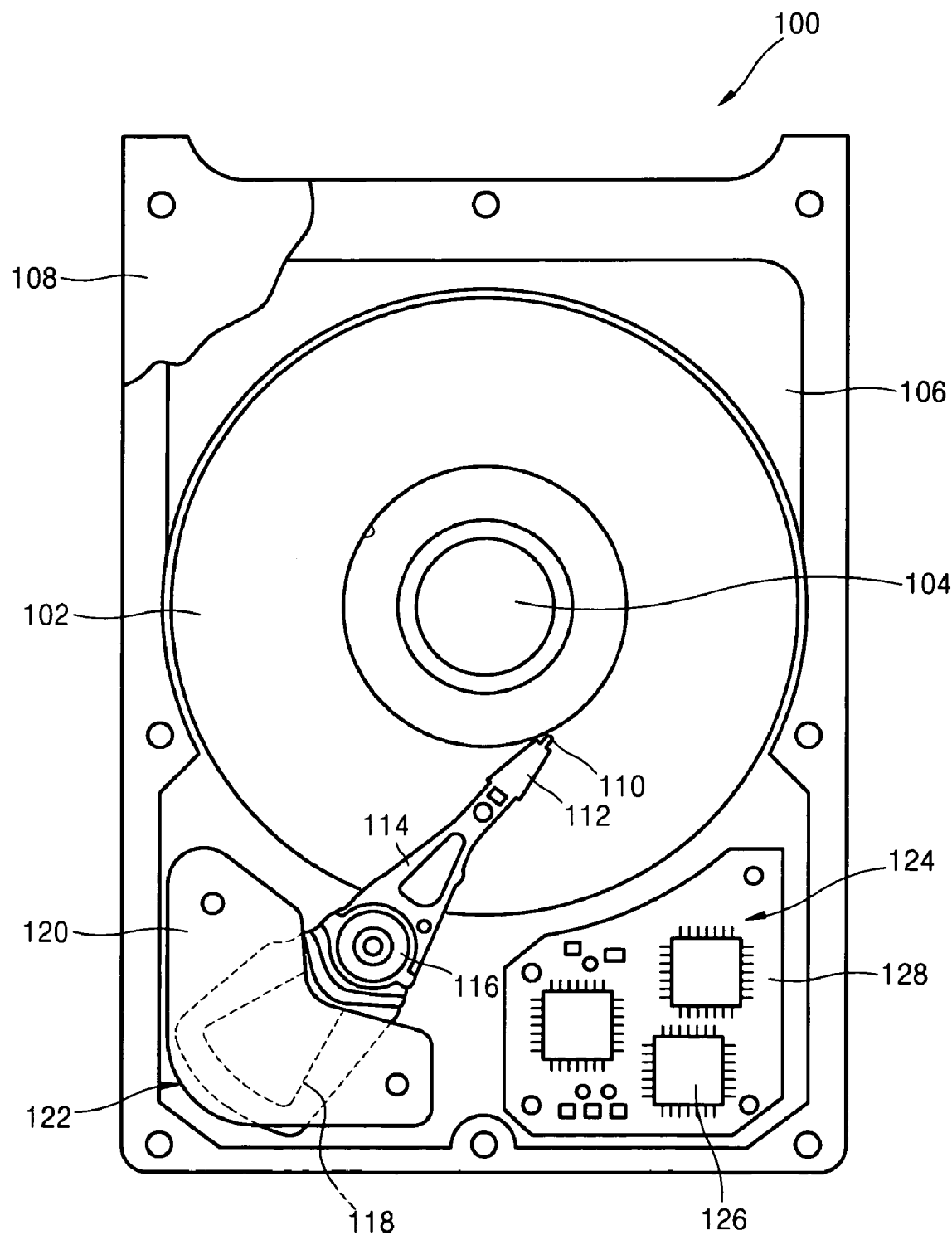
FIG. 2A is a plan view illustrating a hard disc drive (HDD) such as the first or second HDD of FIG. 1.

FIG. 2A is a plan view illustrating a HDD such as the first or second HDD 200 or 100 of FIG. 1. Referring to FIG. 2A, the first or second HDD 200 or 100 includes at least one magnetic disc 102 rotated by a spindle motor 104.

The spindle motor 104 may be installed on a base plate 106 of the first or second HDD 200 or 100. The first or second HDD 200 or 100 may also include a cover 108 that covers the magnetic disc 102.

The first or second HDD 200 or 100 may include a plurality of heads 110. Each of the heads 110 is located in the vicinity of the magnetic disc 102. Each of the heads 110 may include write and read devices (not shown) that magnetize and sense magnetic fields.

Each of the heads 110 is installed on a flexure 112, constitutes a head gimbal assembly (HGA), and maintains a horizontal state. An actuator arm 114 is attached to the flexure 112 and is installed on a base plate 106 to be capable of rotating due to a bearing assembly 116.

The heads 110 may have different properties from one another. For example, the heads may have different numbers of bits per inch, different numbers of tracks per inch, different numbers of tracks, and different sectors per track. Therefore, the heads 110 may achieve different data transmission speeds. Such differences among the heads 110 may be recorded in a system cylinder of the magnetic disc 102.

A voice coil 118 is connected to a magnetic assembly 120 and constitutes a voice coil motor (VCM) 122. When a current is applied to the voice coil 118, a torque is generated so that the actuator arm 114 rotates and the heads 110 move across the surface of the magnetic disc 102.

The first or second HDD 200 or 100 may also include a printed circuit board (PCB) assembly 124. The PCB assembly 124 may include a plurality of integrated circuits 126 connected to the PCB 128. The PCB 128 may be connected to the voice coil 118, the heads 110, and the spindle motor 104 via wires (not shown).

Figure 2B:
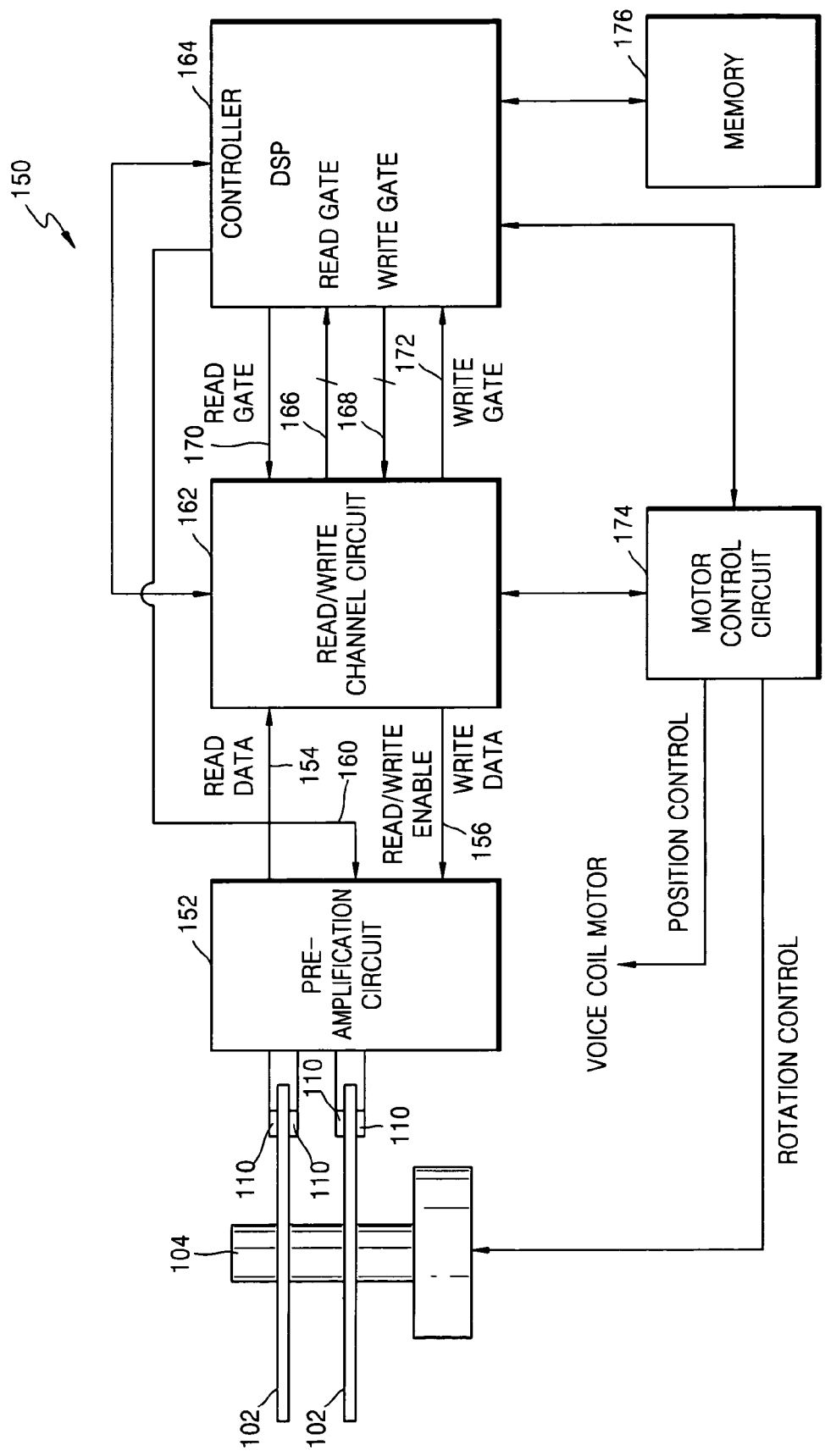
FIG. 2B is a schematic representation of an electrical circuit of a HDD such as the first or second HDD of FIG. 1.

FIG. 2B is a schematic representation of an electrical circuit 150 of a HDD such as the first or second HDD 200 or 100 of FIG. 1. Referring to FIG. 2B, the electrical circuit 150 may include a preamplification circuit 152. The preamplification circuit 152 may include a read data channel 154 and a write data channel 156 connected to a read or write channel circuit 162.

The preamplification circuit 152 may include a read or write enable gate 160 connected to a controller 164. Data may be written to or read from the magnetic disc 102 by enabling the read or write enable gate 160.

The read or write channel circuit 162 may be connected to the controller 164 via the read and write channels 166 and 168 and read and write gates 170 and 172. The read gate 170 is enabled when data needs to be read from the magnetic disc 102. The write gate 172 is enabled when data needs to be written to the magnetic disc 102.

The controller 164 may be a digital signal processor that operates according to predetermined software routines. Here, the software routines may include routines for writing data to or reading data from the magnetic disc 102.

The read or write channel circuit 162 and the controller 164 may be connected to a motor control circuit 174 that controls a VCM (122) of the first or second HDD 200 or 100 and the spindle motor 104.

The controller 164 may be connected to a non-volatile memory device 176. For example, the non-volatile memory device 176 may be a read-only memory (ROM). The non-volatile memory device 176 may store commands needed for operating the controller 164 and the first or second HDD 200 or 100. Alternatively, the controller 164 may include a firmware program that can operate the first or second HDD 200 or 100.

The first or second HDD 200 or 100 generally includes a jumper block having a plurality of jumper pins 310 through 380 (FIG. 3). The operation mode of the first or second HDD 200 or 100 may be determined depending on which of the jumper pins 310 through 380 of the first or second HDD 200 or 100 are connected. Examples of the operation mode of the first or second HDD 200 or 100 include a master mode and a slave mode.

In a system in which two HDDs are connected to a host by a cable, the HDDs that is located farther away from the host than the other HDD may be a master HDD, and the other HDD may be a slave HDD.

Referring to FIG. 2B, when booted, the controller 164 may identify which of the jumper pins 310 through 380 of the first or second HDD 200 or 100 are connected using a firmware program. The controller 164 may change the operation mode of the first or second HDD 200 or 100 or select cables depending on which of the jumper pins 310 through 380 of the first or second HDD 200 or 100 are connected.

Figure 3A:
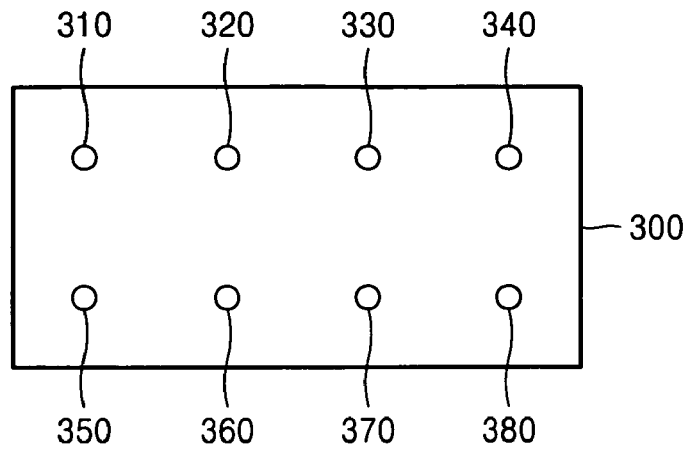
FIG. 3A is a schematic representation of a plurality of jumper pins such as those of the first HDD of FIG. 1, and FIGS. 3B and 3C are schematic representations illustrating which of the jumper pins, such as those of the first HDD of FIG. 1, must be connected to designate a HDD, such as the first HDD of FIG. 1, as a transmitting HDD.
Figure 3B:
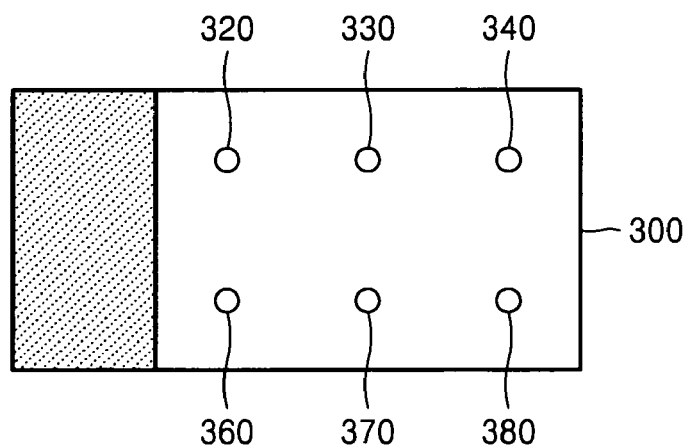
Figure 3C:
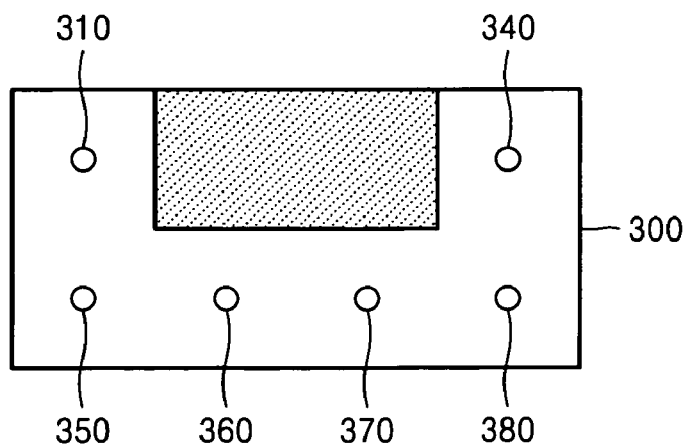

FIG. 3A is a schematic representation of a plurality of jumper pins such as those of the first HDD 200 of FIG. 1, and FIGS. 3B and 3C are schematic representations illustrating which of the jumper pins must be connected to designate a HDD, such as the first HDD 200 of FIG. 1, as a transmitting HDD. Referring to FIG. 3A, the first HDD 200 includes a jumper block 300 having a plurality of jumper pins 310 through 380.

FIG. 3B illustrates that a pair of jumper pins on the far left of the jumper block 300, i.e., the jumper pins 310 and 350 of FIG. 3A, are connected, and FIG. 3C illustrates that an upper pair of jumper pins in the middle of the jumper block 300, i.e., the jumper pins 320 and 330 of FIG. 3A, are connected.

Referring to FIG. 2B, for example, if the jumper pin connection of the first HDD 200 is the same as illustrated in FIG. 3B, the controller 164 may set the first HDD 200 to a master mode after identifying which of the jumper pins 310 through 380 of the first HDD 200 are connected.

If the first HDD 200 has the same jumper pin connection as illustrated in FIG. 3C, the controller 164 may set the first HDD 200 as a transmitting HDD. In short, in order to be designated as a transmitting HDD, the first HDD 200 may have the same jumper pin connection as illustrated in FIG. 3C.

In the present embodiment, when two upper jumper pins in the middle of the jumper block 300 of the first HDD 200, i.e., the jumper pins 320 and 330, are connected, as illustrated in FIG. 3C, the first HDD 200 may be designated as a transmitting HDD. However, the first HDD 200 may be set as a transmitting HDD even when having a different jumper pin connection from the one illustrated in FIG. 3C.

If data stored in a first HDD were able to be freely copied to a second HDD by simply connecting some of a plurality of jumper pins of the first HDD, the security of the data stored in the first HDD would not be fully guaranteed, or the data stored in the first HDD might be accidentally damaged by a user.

Therefore, the copying of data from the first HDD to the second HDD should involve setting the first HDD to a source mode as well as connecting some of a plurality of jumper pins of the first HDD.

Figure 4:
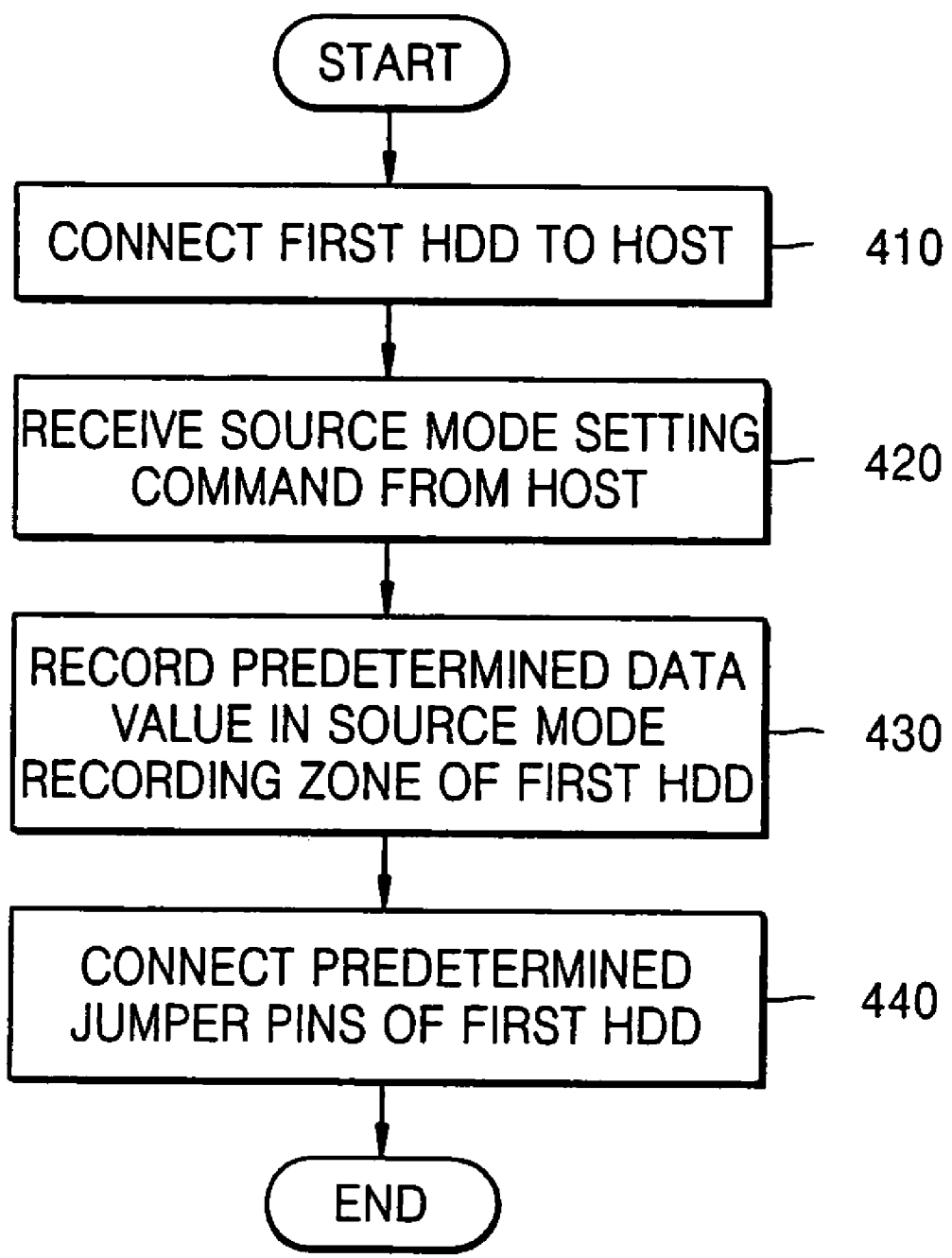
FIG. 4 is a flowchart illustrating a method of designating a first HDD as a transmitting HDD to copy data from the first HDD to a second HDD according to an exemplary embodiment of the present invention.

FIG. 4 is a flowchart illustrating a method of setting a first HDD, such as the first HDD 200 of FIG. 1, as a transmitting HDD in a source mode according to an exemplary embodiment of the present invention. Referring to FIG. 4, in operation 410, the first HDD 200 may be connected to a host. In operation 420, the first HDD 200 may receive a source mode setting command (SET OPERATION MODE command (SRC)) from the host.

In general, the ATA specification provides a smart command as one of its standard commands. A smart command has a code B0h. A smart command uses a feature register value as a subcommand and thus may result in various operations according to the feature register value.

Command values between E0h and FFh are vendor-specific. Thus, the source mode setting command may use part of a command value between E0h and FFh. Even though, in the present embodiment, part of a command value between E0h and FFh is used by the source mode setting command, the present invention is not restricted to such a configuration. Various command values may be used by the source mode setting command.

A command code used by the source mode setting command may be B0h having a feature register value of E0h. The command code B0h indicates that the source mode setting command is a smart command. The source mode setting command is data not related to the transmission of data.

The host also may transmit various information shown in Table 1 to the first HDD 200 when issuing the source mode setting command to the first HDD 200.

TABLE 1

| | Register | | | | | | | |
|---|---|---|---|---|---|---|---|---|
| | 7 | 6 | 5 | 4 | 3 | 2 | 1 | 0 |
| Features | | | | E0h | | | | |
| Sector Count | | | | Mode | | | | |
| Sector Number | | | | Na | | | | |
| Cylinder Low | | | | Na | | | | |
| Cylinder High | | | | Na | | | | |
| Device/Head | obs | Na | obs | DEV | Na | Na | Na | Na |
| Command | | | | B0h | | | | |

Referring to Table 1, the command code used by the source mode setting command is B0h, and the feature register value of the source mode setting command is set to E0h. 'Sector Count' may indicate an operation mode to which the first HDD 200 is desired to be set by the source mode setting command. For example, 'Sector Count' may be set to 2. 'Sector Count' may indicate that an HDD designated by the value of 'Device/Head' is to be set to a source mode when set to, for example, 2.

On the other hand, when set to, for example, 1, 'Sector Count' may indicate that the source mode setting command is a non-source mode setting command (SET OPERATION MODE command (DEST)) and the HDD designated by the value of 'Device/Head' is to be set to a non-source mode.

In operation 430, the first HDD 200 may record a predetermined data value in a source mode recording zone in response to the source mode setting unit received from the host. Accordingly, the first HDD 200 may be set to a source mode. The data value recorded in the source mode recording zone may indicate that the first HDD 200 is currently set to the source mode.

The source mode recording zone may be part of a non-volatile region. For example, the source mode recording zone may be part of a maintenance cylinder. Alternatively, the source mode recording zone may be part of a flash memory. Accordingly, even when the first HDD 200 is turned off and then turned on, the data value recorded in the source mode recording zone is not erased.

The first HDD 200 that receives the source mode setting command outputs data shown in Table 2.

TABLE 2

| | Register | | | | | | | |
|---|---|---|---|---|---|---|---|---|
| | 7 | 6 | 5 | 4 | 3 | 2 | 1 | 0 |
| Error | | | | Na | | | | |
| Sector Count | | | | Na | | | | |
| Sector Number | | | | Na | | | | |
| Cylinder Low | | | | Na | | | | |
| Cylinder High | | | | Na | | | | |
| Device/Head | obs | Na | obs | DEV | Na | Na | Na | Na |
| Status | BSY | DRDY | DF | Na | DRQ | Na | Na | ERR |

Referring to Table 2, BSY, DRDY, DF, DRQ, and ERR may indicate various states of the first HDD 200. In the present embodiment, no operation other than the setting of the first HDD 200 to the source mode is carried out. However, the present invention is not limited to such a configuration.

In operation 440, some of the jumper pins of the first HDD 200 may be connected so that the first HDD 200 has the same jumper pin connection as illustrated in FIG. 3C. Thereafter, the controller 164 of the first HDD 200 may identify which of the jumper pins of the first HDD 200 are connected.

If the controller 164 of the first HDD 200 recognizes that the first HDD 200 has the same jumper pin connection as illustrated in FIG. 3C, it may set the first HDD 200 as a transmitting HDD. Accordingly, data stored in the first HDD 200 may be copied to a receiving HDD, i.e., the second HDD 100.

When booted, the controller 164 may identify which of the jumper pins of the first HDD 200 are connected. For example, when the first HDD 200 is turned off and then turned on or when the first HDD 200 receives a hardware reset command, the controller 164 may also identify which of the jumper pins of the first HDD 200 are connected.

Figure 5A:
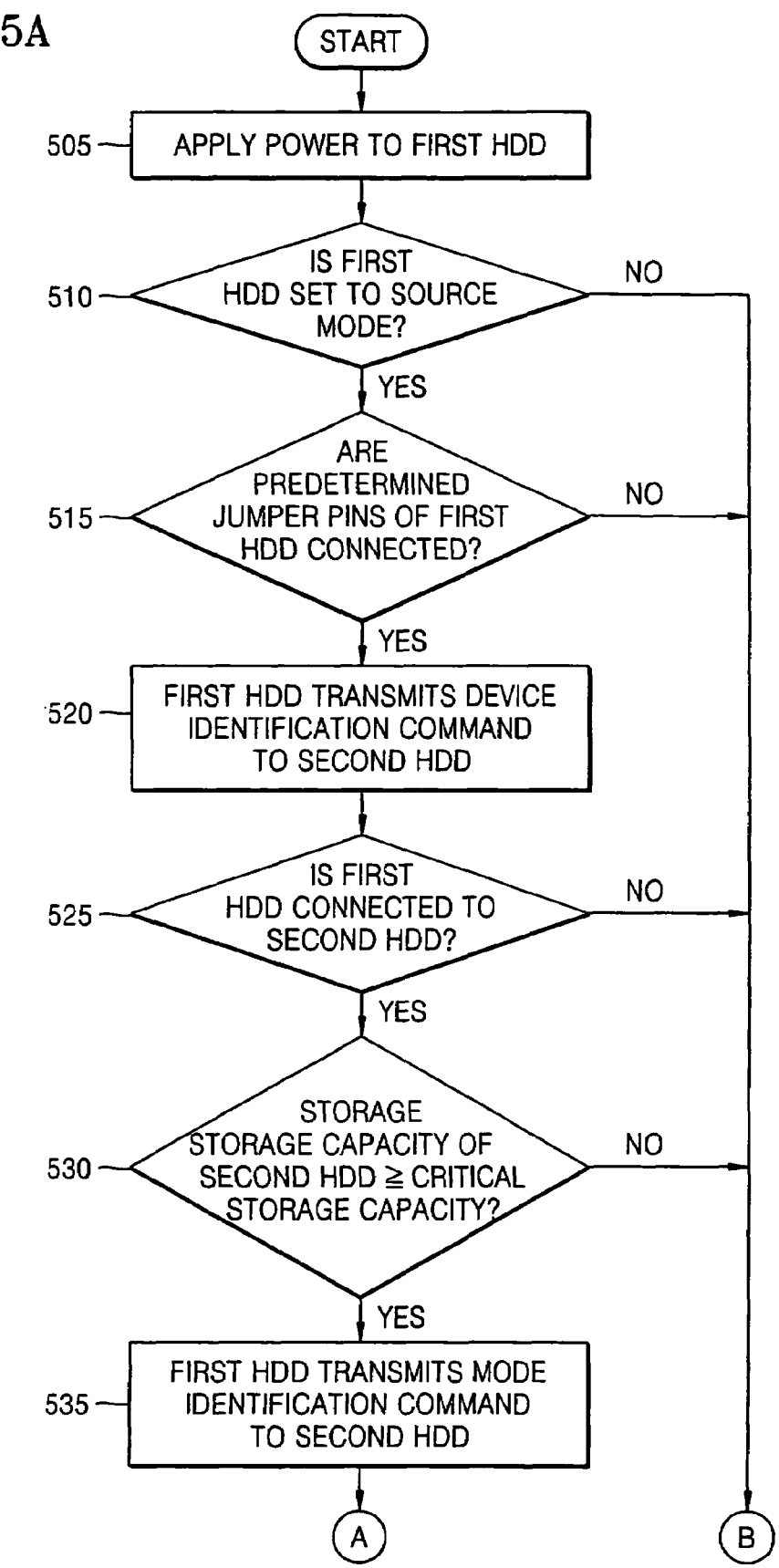
FIGS. 5A and 5B are flowcharts illustrating a method of copying data from a first HDD to a second HDD according to an exemplary embodiment of the present invention.
Figure 5B:
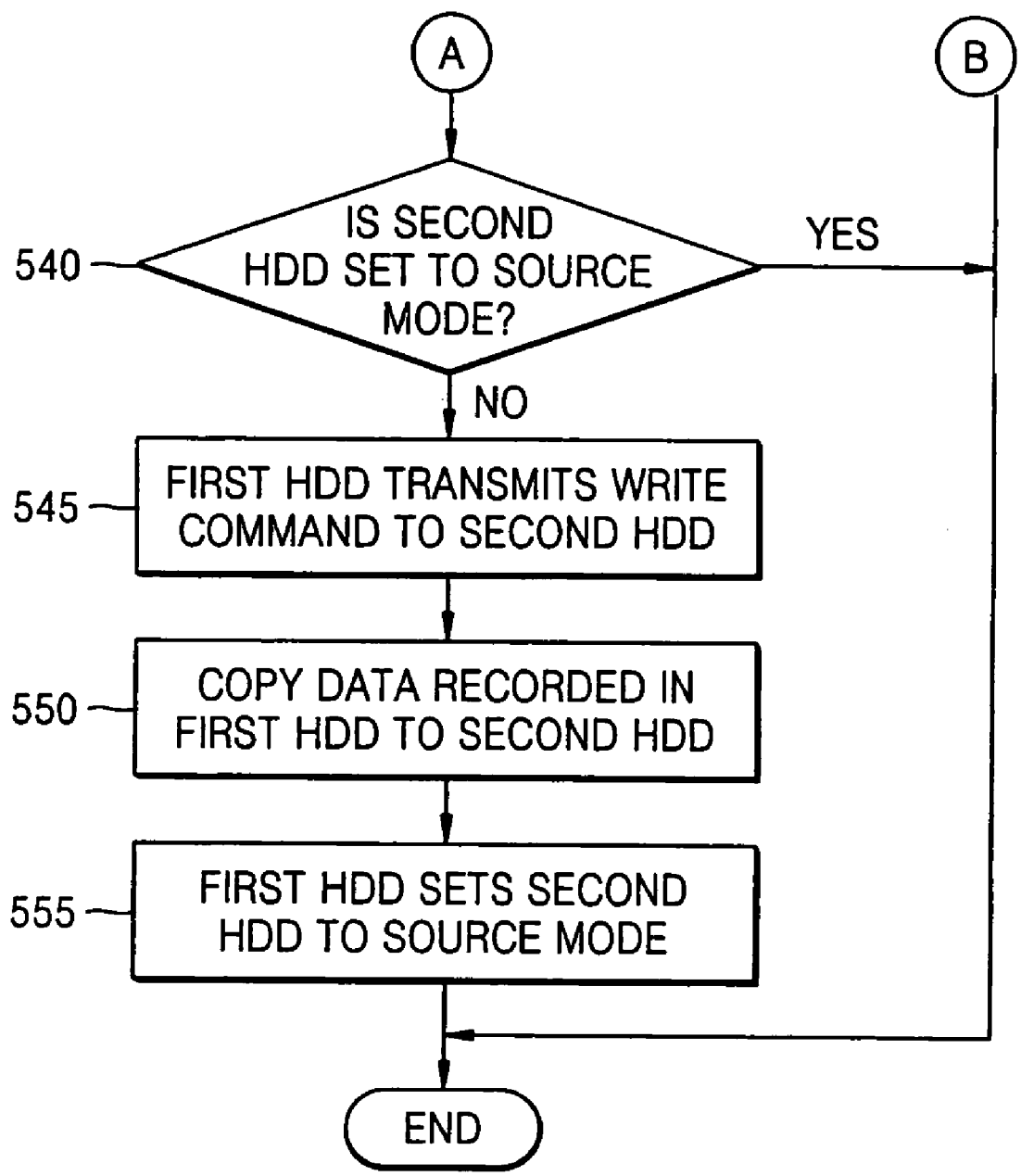

FIGS. 5A and 5B are flowcharts illustrating a method of copying data from a first HDD to a second HDD according to an exemplary embodiment of the present invention. Referring to FIGS. 1, 2A, 2B, 5A, and 5B, in operation 505, power may be supplied to the first HDD 200. In operation 510, when booted, the controller 164 of the first HDD 200 may determine whether the first HDD 200 is in a source mode with reference to, for example, a data value recorded in a source mode recording zone of the first HDD 200.

If the first HDD 200 is determined to be in a source mode, the controller 164 of the first HDD 200 may identify which of a plurality of jumper pins of the first HDD 200 are connected. In operation 515, the controller 164 of the first HDD 200 may determine which of the jumper pins of the first HDD 200 are connected.

If the first HDD 200 has the same jumper pin connection as illustrated in FIG. 3C, the controller 164 of the first HDD 200 may set the first HDD 200 as a transmitting HDD.

In operation 520, the first HDD 200 may transmit a device identification command (IDENTIFY DEVICE command) to the second HDD 100. The device identification command may be a command requesting information on the second HDD 200, such as the type, the storage capacity, and an ATA protocol of the second HDD 200.

In operation 525, the first HDD 200 may determine whether it is connected to the second HDD 100 based on a response to the device identification command received from the second HDD 100.

In operation 530, if the first HDD 200 is connected to the second HDD 100, it may determine whether the storage capacity of the second HDD 100 is larger than a critical storage capacity based on the response to the device identification command received from the second HDD 100. Here, the critical storage capacity may be a minimum storage capacity required for storing all of the data recorded in the first HDD 200.

In operation 535, if the storage capacity of the second HDD 100 is larger than the critical storage capacity, the first HDD 200 may transmit a mode identification command (GET OPERATION MODE command) to the second HDD 100. The mode identification command may be a command requesting information on whether the second HDD 100 is in a source mode.

The mode identification command, like the source mode setting command, may use part of a command value between E0h and FFh. Even though, in the present embodiment, part of a command value between E0h and FFh may be used by the mode identification command, the present invention is not restricted to such a configuration. Various command values may be used by the mode identification command. A command code of the mode identification command may be B0h having a feature register value of E1h.

The first HDD 200 may transmit various data shown in Table 3 to the second HDD 100 when issuing the mode identification command to the second HDD 100.

TABLE 3

| | Register | | | | | | | |
|---|---|---|---|---|---|---|---|---|
| | 7 | 6 | 5 | 4 | 3 | 2 | 1 | 0 |
| Features | | | | Na | | | | |
| Sector Count | | | | Na | | | | |
| Sector Number | | | | Na | | | | |
| Cylinder Low | | | | Na | | | | |
| Cylinder High | | | | Na | | | | |
| Device/Head | obs | Na | obs | DEV | Na | Na | Na | Na |
| Command | | | | B0h | | | | |

Referring to Table 3, the command code of the mode identification code is B0h, and the feature register value of the mode identification code is E1h.

The controller 164 of the second HDD 100 may determine whether the second HDD 100 is in a source mode based on a data value recorded in a source mode recording zone of the second HDD 100 in response to the mode identification command. Thereafter, the second HDD 100 may output various data shown in Table 4 to the first HDD 200.

TABLE 4

| | Register | | | | | | | |
|---|---|---|---|---|---|---|---|---|
| | 7 | 6 | 5 | 4 | 3 | 2 | 1 | 0 |
| Error | | | | Na | | | | |
| Sector Count | | | | Mode | | | | |
| Sector Number | | | | Na | | | | |
| Cylinder Low | | | | Na | | | | |

TABLE 4-continued

| | Register | | | | | | | |
|---|---|---|---|---|---|---|---|---|
| | 7 | 6 | 5 | 4 | 3 | 2 | 1 | 0 |
| Cylinder High | | | | Na | | | | |
| Device/Head | obs | Na | obs | DEV | Na | Na | Na | Na |
| Status | BSY | DRDY | DF | Na | DRQ | Na | Na | ERR |

In operation 540, referring to Table 4, the first HDD 200 may determine whether the second HDD 100 is in a source mode with reference to 'Sector Count' of the second HDD 100. If 'Sector Count' of the second HDD 100 is set to, for example, 2, the second HDD 100 may be in a source mode. However, if 'Sector Count' of the second HDD 100 is set to, for example, 1, the second HDD 100 may be in a non-source mode.

In operation 545, if the second HDD 100 is in a non-source mode, the first HDD 200 may transmit a write command to the second HDD 100. The write command may be a command to copy data recorded in the first HDD 200 to the second HDD 100. The write command may be a write direct memory access (DMA) command. Here, DMA refers to a method to directly access a memory device.

In operation 550, the data recorded in the first HDD 200 may be copied to the second HDD 100.

Once the copying of the data recorded in the first HDD 200 to the second HDD 100 is complete, the first HDD 200 may set the second HDD 100 to a source mode. For this, the first HDD 200 may transmit a source mode setting command to the second HDD 100.

Here, the source mode setting command of FIG. 5A or 5B is basically the same as the source mode setting command of FIG. 4. The only difference between the source mode setting command of FIG. 5A or 5B and the source mode setting command of FIG. 4 is that the former may be transmitted to the first HDD 200 by a host and the latter may be transmitted to the second HDD 100 by the first HDD 200.

Therefore, once the first HDD 200 is set to a source mode by the host, it can set other HDDs including the second HDD 100 to the source mode without the aid of the host.

In operation 555, the second HDD 100 may be set to the source mode by recording a predetermined data value in the source mode recording zone of the second HDD 100 in response to the source mode setting command transmitted by the first HDD 200.

If the second HDD 100 has the same jumper pin connection as illustrated in FIG. 3C, the controller 164 of the second HDD 100 may set the second HDD 100 as a transmitting HDD when the second HDD 100 is turned of and then turned on.

The data value recorded in the source mode recording zone of the second HDD 100 may not be erased even when the second HDD 100 is turned off and then turned on because the source mode recording zone of the second HDD 100 may be a non-volatile zone.

Eventually, both the first and second HDDs 200 and 100 have become a transmitting HDD in a source mode. Thus, the first and second HDDs 200 and 100 can copy data stored therein to other HDDs.

In other words, the first HDD 200 can copy the data stored therein to a third HDD, and the second HDD 100 can copy the data stored therein to a fourth HDD. In addition, the first HDD 200 can set the third HDD to a source mode, and the second HDD 100 can set the fourth HDD to a source mode.

If the third or fourth HDD also has the same jumper pin connection as illustrated in FIG. 3C, all of the first through fourth HDDs may be transmitting HDDs. Therefore, the first through fourth HDDs can copy data stored therein to other HDDs. In short, data stored in one HDD can be copied to another HDD without the aid of a host by repeatedly performing operations 505 through 555.

If the second HDD 100 has the same jumper pin connection as illustrated in FIG. 3C, the second HDD 100 may not be set as a transmitting HDD even when it is turned off and then turned on, in which case, the second HDD 100 may be set to a non-source mode by modifying the data value recorded in the source mode recording zone thereof.

Figure 6:
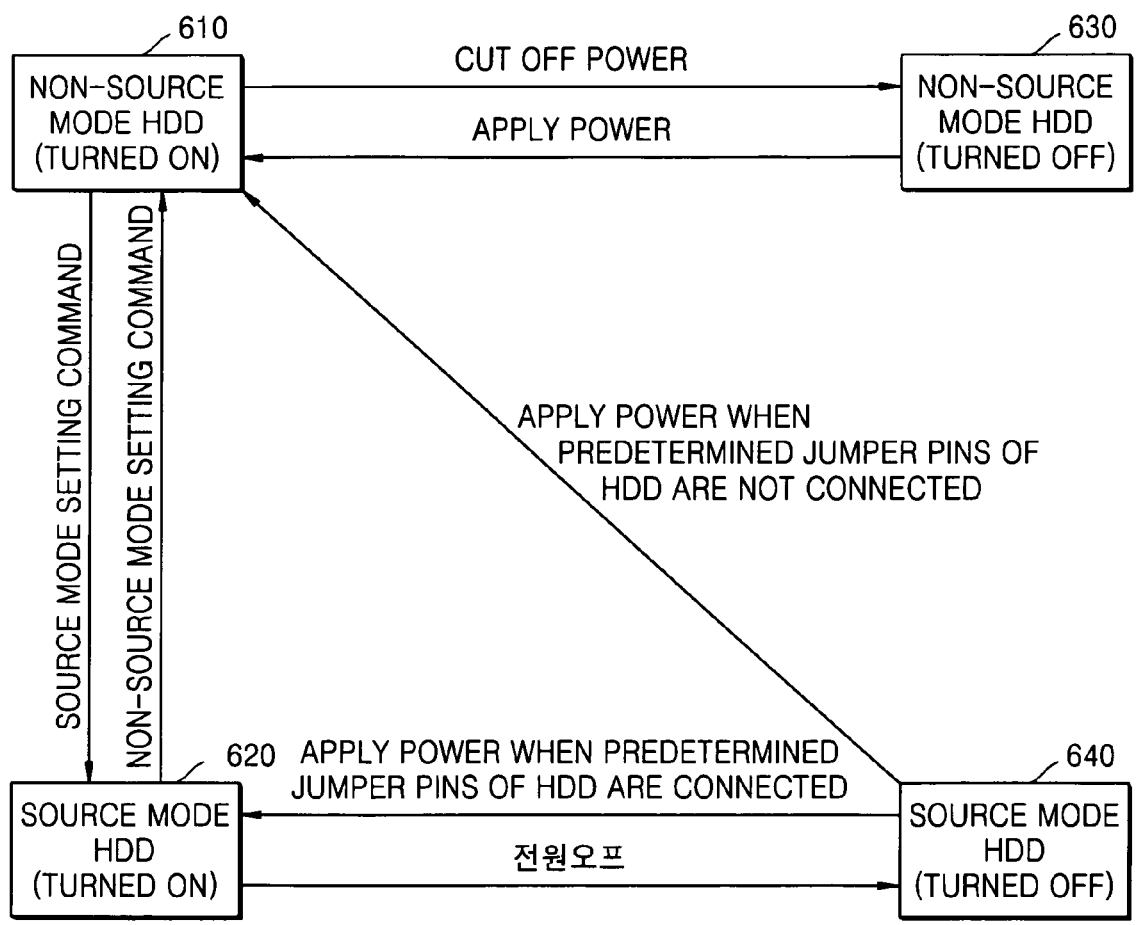
FIG. 6 is a schematic representation of a source mode such as the source mode of FIG. 5A or 5B.

FIG. 6 is a schematic representation of a source mode such as the source mode of FIG. 5A or 5B. Referring to FIG. 6, if an HDD is currently in a non-source mode 610, it may be switched to a source mode 620 and thus become a source mode HDD in response to a source mode setting command when turned on. On the other hand, if the HDD is currently in the source mode 620, it may be switched to the non-source mode 610 and thus become a non-source mode HDD in response to a non-source mode setting command when turned on.

If the HDD is turned off in the non-source mode 610, it may be switched to a non-source mode 630, which is basically the same as the non-source mode 610, and thus remains a non-source mode HDD. If the HDD is turned on in the non-source mode 630, it may return to the non-source mode 610 and thus remains a non-source mode HDD. If the HDD is turned off in the source mode 620, it may be switched to a source mode 640, which is basically the same as the source mode 620, and thus remains a source mode HDD.

However, if the HDD is turned on in the source mode 640, it may be switched to the non-source mode 610 or to the source mode 620 and thus may become a non-source mode HDD or remain a source mode HDD.

Specifically, if the HDD is turned on in the source mode 640 and some of a plurality of jumper pins of the HDD are connected so that the HDD has the same jumper pin connection as illustrated in FIG. 3C, the HDD may be switched to the source mode 620 and thus become a source mode HDD. However, if the HDD has a different jumper pin connection from the jumper pin connection illustrated in FIG. 3C, the HDD may be switched to the non-source mode 610 and thus become a non-source mode HDD even when turned on in the source mode 640.

As described above, according to the present invention, it is possible to copy data recorded in a first HDD to a second HDD without the aid of a host and vice versa. In addition, it is possible to copy data recorded in one HDD to a plurality of HDDs without the aid of the host by repeatedly carrying out the method of copying data of an HDD according to the present invention. Therefore, additional costs for purchasing the host are not incurred.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of copying data from a first disc drive to a second disc drive, the method comprising:

determining whether the first disc drive has a predetermined jumper pin connection by identifying which of a plurality of jumper pins in a jumper block of the first disc drive are connected, the jumper block being used to determine an operation mode of the first disc drive;

transmitting a copy command from the first disc drive to the second disc drive if the first disc drive has the predetermined jumper pin connection; and copying data recorded in the first disc drive to the second disc drive in response to the copy command without the aid of a host computer.

2. The method of claim 1, wherein the transmitting of the copy command comprises:

determining whether the first disc drive is set to a source mode in response to a first source mode setting command if the first disc drive has the predetermined jumper pin connection; and transmitting the copy command from the first disc drive to the second disc drive if the first disc drive is set to the source mode.

3. The method of claim 2, wherein the first disc drive is set to the source mode by recording a predetermined data value in a source mode recording zone of the first disc drive in response to the first source mode setting command.

4. The method of claim 3, wherein the source mode recording zone comprises a non-volatile recording zone.

5. The method of claim 2, wherein the first source mode setting command is transmitted to the first disc drive by a host.

6. The method of claim 2, wherein the first source mode setting command is transmitted to the first disc drive by a disc drive which has the predetermined jumper pin connection and is set to the source mode.

7. The method of claim 1, wherein the copying of the data recorded in the first disc drive to the second disc drive is carried out in a Serial Advanced Technology Attachment (SATA) interface manner.

8. The method of claim 2 further comprising setting the second disc drive to the source mode after the copying of the data recorded in the first disc drive to the second disc drive.

9. The method of claim 8, wherein the second disc drive is set to the source mode in response to a second source mode setting command transmitted thereto by the first disc drive.

10. An apparatus for copying data from a first disc drive to a second disc drive, the apparatus comprising:

a first disc drive to transmit a command to copy data recorded therein if it recognizes that it has a predetermined jumper pin connection by identifying which of a plurality of jumper pins in a jumper block thereof are connected, the jumper block being used to determine an operation mode of the first disc drive;

a second disc drive to copy the data recorded in the first disc drive in response to the command transmitted by the first disc drive without the aid of a host computer; and a communication path to connect an interface unit of the first disc drive and an interface unit of the second disc drive.

11. The apparatus of claim 10, wherein the first disc drive transmits the command if it further recognizes that it is set to a source mode in response to a source mode setting command.

12. The apparatus of claim 11, wherein the first disc drive recognizes whether it is set to the source mode with reference to a data value recorded in a source mode recording zone thereof.

13. The apparatus of claim 12, wherein the source mode recording zone comprises a non-volatile recording zone.

14. The apparatus of claim 12, wherein the source mode recording zone comprises a flash memory zone.

15. The apparatus of claim 12, wherein the data value recorded in the source mode recording zone of the first disc drive is different from a data value recorded in a source mode recording zone of the second disc drive.

16. The apparatus of claim 11, wherein the first disc drive sets the second disc drive to the source mode if the copying of the data recorded therein to the second disc drive is complete.

17. The apparatus of claim 10, wherein the first and second disc drives are SATA hard disc drives (HDD).

18. The apparatus of claim 10, wherein the communication path comprises a communication path connecting SATA HDDs.

19. The apparatus of claim 15, wherein the first disc drive cancels its setting to the source mode if it recognizes that the predetermined jumper pin connection is cut off.

20. A disc drive, comprising:
    determination means for determining an operation mode of the disc drive;
    sending means for sending a copy command to copy data recorded in the disc drive to a destination disc drive upon a predetermined operation mode of the disc drive being detected by the determination mean; and
    data copying means for copying the data recorded in the disc drive to the destination disc drive, in response to the copy command, without the aid of a host computer.

21. A method of copying data from a first disc drive to a second disc drive, and from the first and second disc drives to a plurality of other disk drives comprising:
    determining whether the first disc drive has a predetermined jumper pin connection by identifying which of a plurality of jumper pins in a jumper block of the first disc drive are connected, the jumper block being used to determine an operation mode of the first disc drive;
    transmitting a copy command from the first disc drive to the second disc drive when the first disc drive has the predetermined jumper pin connection; and
    copying data recorded in the first disc drive to the second disc drive in response to the copy command;
    transmitting a source mode setting command from the first disc drive to the second disc drive to set the second disc drive to a source mode once the copying of data from the first disc drive to the second disc drive is complete;
    setting the second disc drive as a transmitting drive when the second drive has the predetermined jumper pin connection; and
    copying the data recorded in the first disc drive to a third disc drive and copying the data recorded in the second disc drive to a fourth disc drive in response to copy commands.

* * * * *

UNITED STATES PATENT AND TRADEMARK OFFICE
CERTIFICATE OF CORRECTION

PATENT NO. : 7,663,826 B2  Page 1 of 1
APPLICATION NO. : 11/330169
DATED : February 16, 2010
INVENTOR(S) : Jin-won Choi It is certified that error appears in the above-identified patent and that said Letters Patent is hereby corrected as shown below:

Column 11, Line 22, change "mean;" to --means;--.

Signed and Sealed this

Eleventh Day of May, 2010

David J. Kappos
*Director of the United States Patent and Trademark Office*